United States Patent
Han et al.

(10) Patent No.: US 12,455,825 B2
(45) Date of Patent: Oct. 28, 2025

(54) METHOD FOR SUPPORTING CACHE COHERENCY BASED ON VIRTUAL ADDRESSES FOR ARTIFICIAL INTELLIGENCE PROCESSOR HAVING LARGE ON-CHIP MEMORY AND APPARATUS FOR THE SAME

(71) Applicant: ELECTRONICS AND TELECOMMUNICATIONS RESEARCH INSTITUTE, Daejeon (KR)

(72) Inventors: Jin-Ho Han, Daejeon (KR); Young-Su Kwon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 30 days.

(21) Appl. No.: 18/522,776

(22) Filed: Nov. 29, 2023

(65) Prior Publication Data

US 2024/0211401 A1 Jun. 27, 2024

(30) Foreign Application Priority Data

Nov. 29, 2022 (KR) .......... 10-2022-0163064
Jul. 7, 2023 (KR) .......... 10-2023-0088228

(51) Int. Cl.
*G06F 12/08* (2016.01)
*G06F 12/0815* (2016.01)
*G06F 12/1027* (2016.01)

(52) U.S. Cl.
CPC ...... *G06F 12/0815* (2013.01); *G06F 12/1027* (2013.01)

(58) Field of Classification Search
CPC .... G06F 12/0815; G06F 12/1027; G06F 3/06; G06F 12/0893; G06F 13/16
USPC .......................................... 711/141
See application file for complete search history.

(56) References Cited

U.S. PATENT DOCUMENTS

| 9,348,764 B2 | 5/2016 | Kim et al. |
| 10,564,972 B1* | 2/2020 | Doshi ................. G06F 9/30145 |
| 11,769,735 B2 | 9/2023 | Pietambaram et al. |
| 2015/0143049 A1 | 5/2015 | Han et al. |
| 2021/0334143 A1 | 10/2021 | Kim et al. |
| 2022/0206817 A1* | 6/2022 | Kotra ................... G06F 9/30087 |

FOREIGN PATENT DOCUMENTS

| KR | 10-2015-0050786 A | 5/2015 |
| KR | 10-2022-0056841 A | 5/2022 |

* cited by examiner

Primary Examiner — Hua J Song

(57) ABSTRACT

Disclosed herein are a method for supporting cache coherency based on virtual addresses for an artificial intelligence processor having large on-chip memory and an apparatus for the same. The method for supporting cache coherency according to an embodiment of the present disclosure includes, by an artificial intelligence processor including multiple processor cores and multiple caches, setting external memory address areas which do not overlap each other for respective multiple caches; and providing virtual addresses with which the multiple processor cores access the multiple caches.

16 Claims, 4 Drawing Sheets

METHOD FOR SUPPORTING CACHE COHERENCY BASED ON VIRTUAL ADDRESSES FOR ARTIFICIAL INTELLIGENCE PROCESSOR HAVING LARGE ON-CHIP MEMORY AND APPARATUS FOR THE SAME

CROSS REFERENCE TO RELATED APPLICATION

This application claims the benefit of Korean Patent Application Nos. 10-2022-0163064, filed Nov. 29, 2022 and 10-2023-0088228, filed Jul. 7, 2023, which are hereby incorporated by reference in their entireties into this application.

BACKGROUND OF THE INVENTION

1. Technical Field

The present disclosure relates generally to a method for supporting cache coherency based on virtual addresses for an artificial intelligence processor having large on-chip memory and an apparatus for the method, and more particularly to a structure for supporting cache coherency and virtual addresses in caches integrated with processor cores forming the artificial intelligence processor having large on-chip memory.

2. Description of the Related Art

Recently, in response to the demand for a high-performance artificial intelligence processor, many processor cores (access node controllers: ANC) have been integrated into one die, and caches for respective processor cores are installed in the die so that the number of caches is identical to the number of processor cores, as shown in FIG. 1. In this case, the number of cases where many processor cores process different pieces of data based on the same instruction configuration increases.

Further, maintaining cache coherency among multiple caches using only an existing directory-type cache coherency design may cause excessive performance deterioration.

Therefore, there is required a new scheme for maintaining cache coherency among multiple caches.

PRIOR ART DOCUMENTS

Patent Documents (Patent Document 1) Korean Patent Application Publication No. 10-2015-0050786, Date of Publication: May 11, 2015 (Title: Cache management Method for core and peripheral core)

SUMMARY OF THE INVENTION

An object of the present disclosure is to provide a method that is capable of maintaining cache coherency among multiple caches in an artificial intelligence processor having large on-chip memory.

Another object of the present disclosure is to provide a structure for supporting virtual addresses, which allows multiple processor cores to process different pieces of data based on the same instruction configuration.

A further object of the present disclosure is to quickly invoke software running on multiple processor cores.

A method for supporting cache coherency based on virtual addresses according to the present disclosure to accomplish the above objects includes, by an artificial intelligence processor including multiple processor cores and multiple caches, setting external memory address areas which do not overlap each other for respective multiple caches; and providing virtual addresses with which the multiple processor cores access the multiple caches.

Here, the setting may include setting the external memory address areas in consideration of programs running on the multiple processor cores and access distances between the multiple processor cores and the multiple caches.

Here, the setting may further include setting the external memory address areas such that data required for running each program is stored in a cache with a shortest access distance to each of the multiple processor cores.

Here, the setting may further include setting, by a bus present between the multiple processor cores and the multiple caches, the external memory address areas based on memory map information related to the multiple caches.

Here, the method may further include detecting, by the artificial intelligence processor, the programs running on the multiple processor cores.

Here, the virtual addresses may be provided to correspond to exclusive addresses such that the multiple processor cores are capable of simultaneously accessing identical data.

Here, the bus may be configured to acquire mapping information between physical addresses corresponding to the multiple caches and the virtual addresses based on Translation Lookaside Buffers (TLB) that are capable of being set by a system controller of the artificial intelligence processor and to provide the virtual addresses to the multiple processor cores in consideration of the mapping information.

Here, the external memory address areas may correspond to address areas of a High Bandwidth Memory (HBM) located outside the artificial intelligence processor.

Here, for respective pieces of data to be stored in the multiple caches, a cache in which corresponding data is to be stored may be determined in consideration of data dependency, and may be determined such that, as the data dependency is higher, the corresponding data is stored in a cache with which a cache distance corresponding to a distance between caches is shorter.

Further, an artificial intelligence processor according to the present disclosure includes multiple processor cores; multiple caches corresponding to the multiple processor cores; a system controller (SCP); and a bus located between the multiple processor cores and the multiple caches, wherein the bus is configured to set external memory address areas which do not overlap each other for respective multiple caches, and provide virtual addresses with which the multiple processor cores access the multiple caches.

Here, the bus may be configured to set the external memory address areas in consideration of programs running on the multiple processor cores and access distances between the multiple processor cores and the multiple caches.

Here, the bus may be configured to set the external memory address areas such that data required for running each program is stored in a cache with a shortest access distance to each of the multiple processor cores.

Here, the bus may be configured such that a bus present between the multiple processor cores and the multiple caches sets the external memory address areas based on memory map information related to the multiple caches.

Here, the bus may be configured to detect the programs running on the multiple processor cores.

Here, the virtual addresses may be provided to correspond to exclusive addresses such that the multiple processor cores are capable of simultaneously accessing identical data.

Here, the bus may be configured to acquire mapping information between physical addresses corresponding to the multiple caches and the virtual addresses based on Translation Lookaside Buffers (TLB) that are capable of being set by a system controller of the artificial intelligence processor and to provide the virtual addresses to the multiple processor cores in consideration of the mapping information.

Here, the external memory address areas may correspond to address areas of a High Bandwidth Memory (HBM) located outside the artificial intelligence processor.

Here, for respective pieces of data to be stored in the multiple caches, a cache in which corresponding data is to be stored may be determined in consideration of data dependency, and may be determined such that, as the data dependency is higher, the corresponding data is stored in a cache with which a cache distance corresponding to a distance between caches is shorter.

BRIEF DESCRIPTION OF THE DRAWINGS

The above and other objects, features and advantages of the present disclosure will be more clearly understood from the following detailed description taken in conjunction with the accompanying drawings, in which.

DESCRIPTION OF THE PREFERRED EMBODIMENTS

Figure 1:
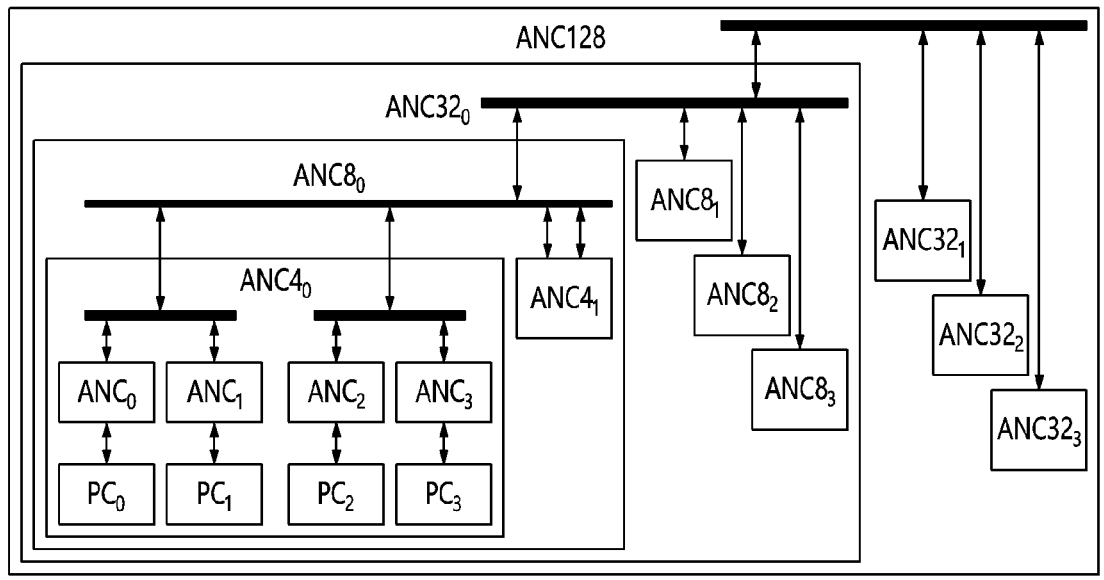
FIG. 1 is a diagram illustrating the structure of an artificial intelligence processor composed of 128 processor cores.

The present disclosure will be described in detail below with reference to the accompanying drawings. Repeated descriptions and descriptions of known functions and configurations which have been deemed to make the gist of the present disclosure unnecessarily obscure will be omitted below. The embodiments of the present disclosure are intended to fully describe the present disclosure to a person having ordinary knowledge in the art to which the present disclosure pertains. Accordingly, the shapes, sizes, etc. of components in the drawings may be exaggerated to make the description clearer.

In the present specification, each of phrases such as "A or B", "at least one of A and B", "at least one of A or B", "A, B, or C", "at least one of A, B, and C", and "at least one of A, B, or C" may include any one of the items enumerated together in the corresponding phrase, among the phrases, or all possible combinations thereof.

Hereinafter, preferred embodiments of the present disclosure will be described in detail with reference to the attached drawings.

Figure 2:
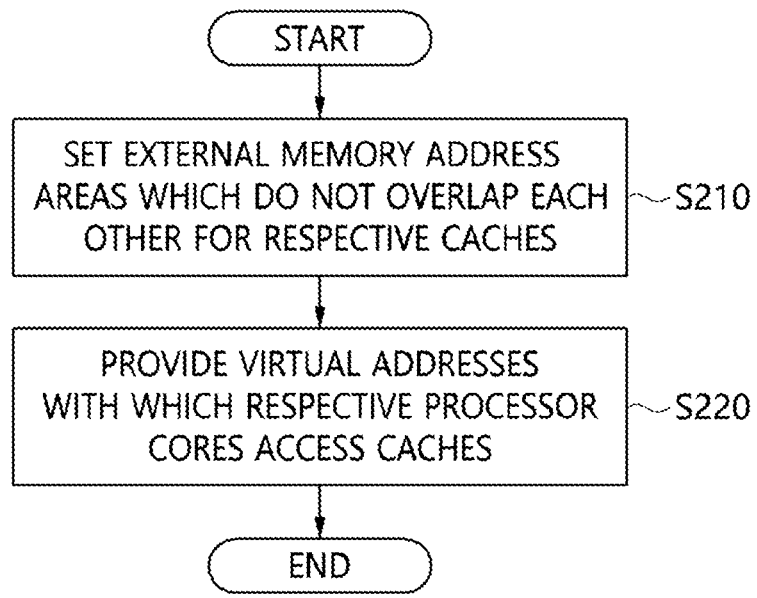
FIG. 2 is an operation flowchart illustrating a method for supporting cache coherency based on virtual addresses for an artificial intelligence processor having large on-chip memory according to an embodiment of the present disclosure.

FIG. 2 is an operation flowchart illustrating a method for supporting cache coherency based on virtual addresses for an artificial intelligence processor having large on-chip memory according to an embodiment of the present disclosure.

Referring to FIG. 2, in the method for supporting cache coherency based on virtual addresses for the artificial intelligence processor having large on-chip memory according to the embodiment of the present disclosure, the artificial intelligence processor including multiple processor cores and multiple caches sets external memory address areas which do not overlap each other for respective multiple caches at step S210.

Here, the external memory address areas may correspond to the address areas of High-Bandwidth Memory (HBM) located outside the artificial intelligence processor. For example, the external memory address areas may correspond to HBM memory pseudo channel areas.

Here, the artificial intelligence processor according to the embodiment of the present disclosure may include the multiple processor cores, the multiple caches, a system controller, and a bus located between the multiple processor cores and the multiple caches.

Therefore, the caches connected to respective processor cores may be configured such that only one copy stored in the HBM memory is present in an artificial intelligence processor chip by storing only a specific pseudo channel area among the external memory address areas. That is, only one copy is stored in each cache, and thus all caches in the artificial intelligence processor may be configured at one level. The HBM memory areas which do not overlap each other in this way are stored in respective caches, thus naturally supporting a cache coherency mechanism and preventing performance deterioration attributable to the processing of the cache coherency mechanism.

In this case, the external memory address areas may be set in consideration of programs running on the multiple processor cores and the access distances between the multiple processor cores and the multiple caches.

Here, the external memory address areas may be set such that data required for running each program is stored in a cache with the shortest access distance to each of the multiple processor cores.

Therefore, each processor core according to the present disclosure may access the cache closest thereto, and may then use data required for running the program.

For example, each of the multiple processor cores may access a cache closer thereto (=cache with a shorter access distance) or access a cache farther thereto (=cache with a longer access distance), thus reading data stored at a required address and writing data thereto.

Here, the bus present between the multiple processor cores and the multiple caches may set the external memory address areas based on memory map information related to the multiple caches.

For example, the bus according to the embodiment of the present disclosure may set the HBM memory areas stored by respective caches, and the areas set in this way may be managed by the bus in a form corresponding to configurable memory map information.

Further, although not illustrated in FIG. 2, in the method for supporting cache coherency based on virtual addresses for the artificial intelligence processor having large on-chip memory according to the embodiment of the present disclosure, the artificial intelligence processor detects programs running on the multiple processor cores.

Furthermore, in the method for supporting cache coherency based on virtual addresses for the artificial intelligence processor having large on-chip memory according to the embodiment of the present disclosure, the artificial intelligence processor including the multiple processor cores and the multiple caches may provide virtual addresses with which the multiple processor cores access the multiple caches.

Here, the virtual addresses may be provided to correspond to exclusive addresses so that the multiple processor cores can simultaneously access the same data.

Here, the bus may acquire mapping information between physical addresses corresponding to the multiple caches and the virtual addresses based on Translation Lookaside Buffers (TLB) that can be set by the system controller of the artificial intelligence processor, and may provide the virtual addresses to the multiple processor cores in consideration of the mapping information.

Figure 5:
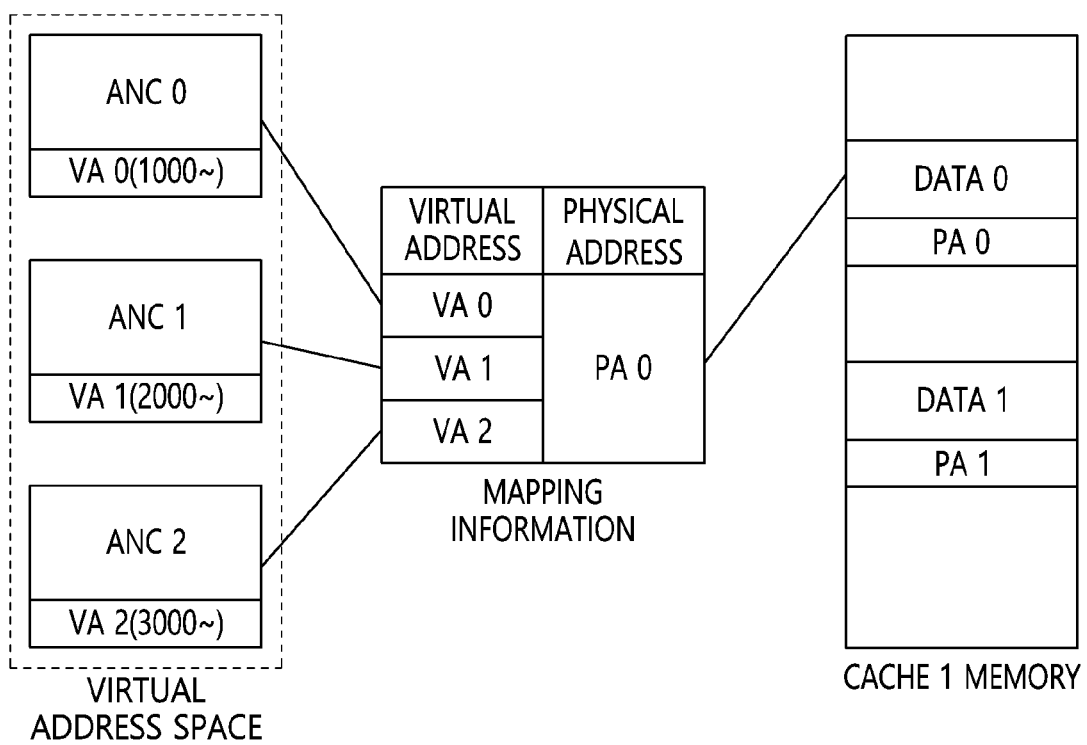
FIG. 5 is a diagram illustrating an example of a mapping process for supporting virtual addresses according to the present disclosure.

For example, the bus of the artificial intelligence processor according to the embodiment of the present disclosure may acquire mapping information from virtual addresses, set by the system controller, to physical addresses through the Translation Lookaside Buffers (TLB) that can be set by the system controller in the state in which the Translation Lookaside Buffers (TLB) are interposed between the processor cores and the caches. For example, as illustrated in FIG. 5, mapping information between virtual addresses (VAx) for respective processor cores (ANCx) and the physical address (PAx) of a cache may be acquired.

Here, the physical address areas translated by respective Translation Lookaside Buffers (TLB) may be exclusive to each other.

In this case, for respective pieces of data to be stored in multiple caches, a cache in which the corresponding data is to be stored may be determined in consideration of data dependency, wherein, as the data dependency is higher, the corresponding data may be stored in a cache with which a cache distance corresponding to the distance between caches is shorter.

Figure 3:
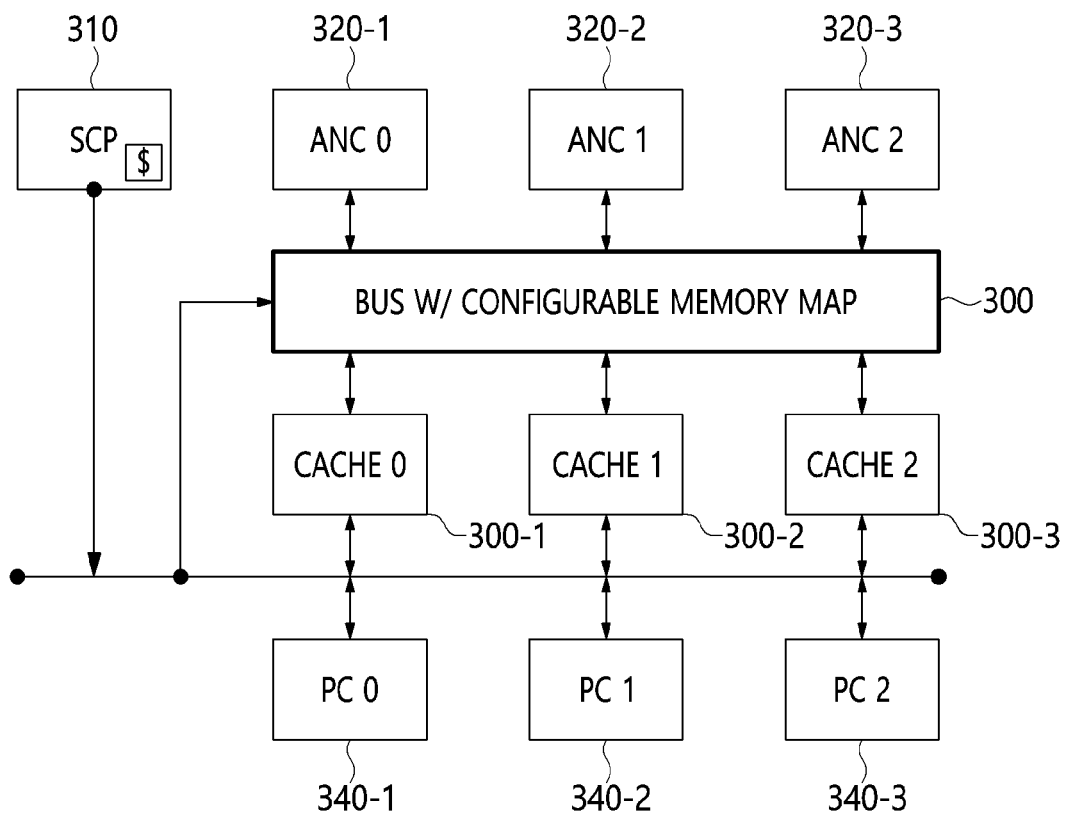
FIGS. 3 and 4 are diagrams illustrating an example of the structure of an artificial intelligence processor for supporting cache coherency and virtual addresses according to the present disclosure.

For example, for cache 0 300-1 illustrated in FIG. 3, cache distances to cache 1 300-2 and cache 2 300-3 may be calculated in advance, and access times depending on the calculated cache distances may be respectively stored. In this manner, for cache 1 300-2 and cache 2 300-3, respective cache distances and access times may also be calculated and stored. Thereafter, the data dependency of pieces of data to be stored in the corresponding caches may be checked. Data having relatively high data dependency may be determined to be stored in a cache with a relatively short cache distance so that other caches are capable of quickly accessing the data.

By means of this method for supporting cache coherency based on virtual addresses for the artificial intelligence processor having large on-chip memory, there can be provided a method that is capable of maintaining cache coherency among multiple caches in the artificial intelligence processor having large on-chip memory.

Further, there can be provided a structure for supporting virtual addresses, which allows multiple processor cores to process different pieces of data based on the same instruction configuration.

Furthermore, software running on multiple processor cores can be quickly invoked.

Figure 4:
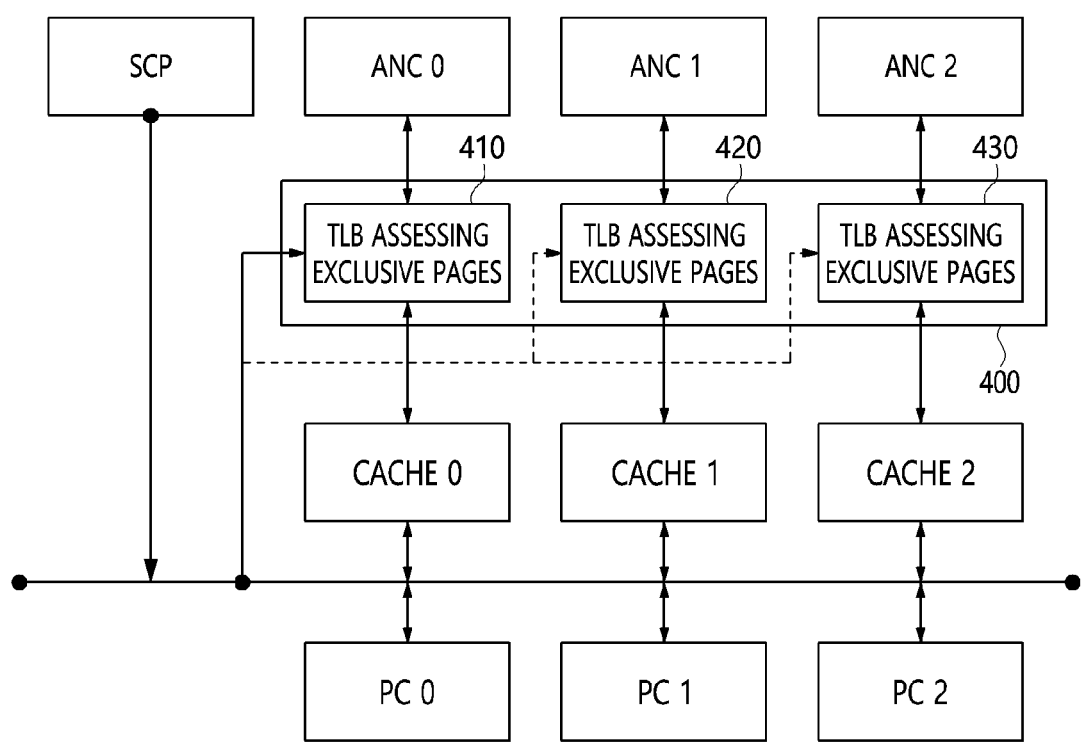

FIGS. 3 and 4 are diagrams illustrating an example of the structure of an artificial intelligence processor for supporting cache coherency and virtual addresses according to the present disclosure.

First, referring to FIG. 3, the artificial intelligence processor for supporting cache coherency and virtual addresses according to the present disclosure may include multiple processor cores 320-1 to 320-3, multiple caches 300-1 to 300-3, a system controller 310, and a bus 300 disposed between the multiple processor cores and the multiple caches.

Here, although a structure including three processor cores and three caches is illustrated in FIG. 3, the structure may actually include more processor cores and more caches.

The bus 300 may be disposed between the multiple processor cores 320-1 to 320-3 and the multiple caches 300-1 to 300-3.

Hereinafter, a process of supporting cache coherency based on virtual addresses through the bus 300 will be described in detail.

The bus 300 sets external memory address areas which do not overlap each other for respective multiple caches.

Here, the external memory address areas may correspond to the address areas of High-Bandwidth Memory (HBM) located outside the artificial intelligence processor. For example, the external memory address areas may correspond to HBM memory pseudo channel areas. In FIG. 3, these areas are illustrated as corresponding to HBM Memory Pseudo Channel Controllers (PCx) 340-1 to 340-3.

Therefore, the caches connected to respective processor cores may be configured such that only one copy stored in the HBM memory is present in an artificial intelligence processor chip by storing only a specific pseudo channel area among the external memory address areas. That is, only one copy is stored in each cache, and thus all caches in the artificial intelligence processor may be configured at one level. The HBM memory areas which do not overlap each other in this way are stored in respective caches, thus naturally supporting a cache coherency mechanism and preventing performance deterioration attributable to the processing of the cache coherency mechanism.

In this case, the external memory address areas may be set in consideration of programs running on the multiple processor cores and the access distances between the multiple processor cores and the multiple caches.

Here, the external memory address areas may be set such that data required for running each program is stored in a cache with the shortest access distance to each of the multiple processor cores.

Therefore, each processor core according to the present disclosure may access the cache closest thereto, and may then use data required for running the program.

For example, each of the multiple processor cores may access a cache closer thereto (=cache with a shorter access distance) or access a cache farther thereto (=cache with a longer access distance), thus reading data stored at a required address and writing data thereto.

Here, the bus present between the multiple processor cores and the multiple caches may set the external memory address areas based on memory map information related to the multiple caches.

For example, the bus according to the embodiment of the present disclosure may set the HBM memory areas stored by respective caches, and the areas set in this way may be managed by the bus in a form corresponding to configurable memory map information.

Further, the bus 300 detects programs running on the multiple processor cores.

Furthermore, the bus 300 may provide virtual addresses with which the multiple processor cores access the multiple caches.

Here, the virtual addresses may be provided to correspond to exclusive addresses so that the multiple processor cores can simultaneously access the same data.

Here, the bus may acquire mapping information between physical addresses corresponding to the multiple caches and the virtual addresses based on Translation Lookaside Buffers (TLB) that can be set by the system controller of the artificial intelligence processor, and may provide the virtual addresses to the multiple processor cores in consideration of the mapping information.

For example, referring to FIG. 4, the bus 400 of the artificial intelligence processor according to the embodiment of the present disclosure may acquire mapping information from virtual addresses, set by the system controller, to physical addresses through Translation Lookaside Buffers (TLB) 410 to 430 that can be set by the system controller in the state in which the Translation Lookaside Buffers (TLB) are interposed between the processor cores and the caches. For example, as illustrated in FIG. 5, mapping information between virtual addresses (VAx) for respective processor cores (ANCx) and the physical address (PAx) of a cache may be acquired.

Here, the physical address areas translated by respective Translation Lookaside Buffers (TLB) may be exclusive to each other.

In this case, for respective pieces of data to be stored in multiple caches, a cache in which the corresponding data is to be stored may be determined in consideration of data dependency, wherein, as the data dependency is higher, the corresponding data may be stored in a cache with which a cache distance corresponding to the distance between caches is shorter.

By means of the artificial intelligence processor, there can be provided a method that is capable of maintaining cache coherency among multiple caches in the artificial intelligence processor having large on-chip memory.

Further, there can be provided a structure for supporting virtual addresses, which allows multiple processor cores to process different pieces of data based on the same instruction configuration.

Furthermore, software running on multiple processor cores can be quickly invoked.

According to the present disclosure, there can be provided a method that is capable of maintaining cache coherency among multiple caches in an artificial intelligence processor having large on-chip memory.

Further, the present disclosure can provide a structure for supporting virtual addresses, which allows multiple processor cores to process different pieces of data based on the same instruction configuration.

Furthermore, the present disclosure can quickly invoke software running on multiple processor cores.

As described above, in the method for supporting cache coherency based on virtual addresses for an artificial intelligence processor having large on-chip memory and the apparatus for the method according to the present disclosure, the configurations and schemes in the above-described embodiments are not limitedly applied, and some or all of the above embodiments can be selectively combined and configured such that various modifications are possible.

What is claimed is:

1. A method for supporting cache coherency based on virtual addresses, the method comprising:
   by an artificial intelligence processor including multiple processor cores, multiple caches, and a bus located between the multiple processor cores and the multiple caches,
   setting, among the multiple caches, external memory address areas which do not overlap with each other; and
   providing virtual addresses with which the multiple processor cores access the multiple caches,
   wherein the external memory address areas respectively correspond to address areas of an external memory located outside the artificial intelligence processor, and
   wherein the setting of the external memory address areas is performed by the bus based on memory map information associated with both the multiple caches and the external memory.

2. The method of claim 1, wherein the setting comprises:
   setting the external memory address areas in consideration of programs running on the multiple processor cores and access distances between the multiple processor cores and the multiple caches.

3. The method of claim 2, wherein the setting further comprises:
   setting the external memory address areas such that data required for running each program is stored in a cache with a shortest access distance to each of the multiple processor cores.

4. The method of claim 2, further comprising:
   detecting, by the artificial intelligence processor, the programs running on the multiple processor cores.

5. The method of claim 1, wherein the virtual addresses are provided to correspond to exclusive addresses such that the multiple processor cores are capable of accessing identical data.

6. The method of claim 1, wherein the bus is configured to acquire mapping information between physical addresses corresponding to the multiple caches and the virtual addresses based on Translation Lookaside Buffers (TLB) that are capable of being set by a system controller of the artificial intelligence processor and to provide the virtual addresses to the multiple processor cores in consideration of the mapping information.

7. The method of claim 1, wherein the external memory is a High Bandwidth Memory (HBM).

8. The method of claim 1, wherein, for respective pieces of data to be stored in the multiple caches, a cache in which corresponding data is to be stored is determined in consideration of data dependency, and is determined such that, as the data dependency is higher, the corresponding data is stored in a cache with which a cache distance corresponding to a distance between caches is shorter.

9. An artificial intelligence processor, comprising:
   multiple processor cores;
   multiple caches corresponding to the multiple processor cores;
   a system controller (SCP); and
   a bus located between the multiple processor cores and the multiple caches,
   wherein the bus is configured to set, among the multiple caches, external memory address areas which do not overlap each other, and provide virtual addresses with which the multiple processor cores access the multiple caches,
   wherein the external memory address areas respectively correspond to address areas of an external memory located outside the artificial intelligence processor, and wherein the bus sets the external memory address areas based on memory map information associated with both the multiple caches and the external memory.

10. The artificial intelligence processor of claim 9, wherein the bus is configured to set the external memory address areas in consideration of programs running on the multiple processor cores and access distances between the multiple processor cores and the multiple caches.

11. The artificial intelligence processor of claim 10, wherein the bus is configured to set the external memory address areas such that data required for running each program is stored in a cache with a shortest access distance to each of the multiple processor cores.

12. The artificial intelligence processor of claim 10, wherein the bus is configured to detect the programs running on the multiple processor cores.

13. The artificial intelligence processor of claim 9, wherein the virtual addresses are provided to correspond to exclusive addresses such that the multiple processor cores are capable of accessing identical data.

14. The artificial intelligence processor of claim 9, wherein the bus is configured to acquire mapping information between physical addresses corresponding to the multiple caches and the virtual addresses based on Translation Lookaside Buffers (TLB) that are capable of being set by a system controller of the artificial intelligence processor and to provide the virtual addresses to the multiple processor cores in consideration of the mapping information.

15. The artificial intelligence processor of claim 9, wherein the external memory is a High Bandwidth Memory (HBM).

16. The artificial intelligence processor of claim 9, wherein for respective pieces of data to be stored in the multiple caches, a cache in which corresponding data is to be stored is determined in consideration of data dependency, and is determined such that, as the data dependency is higher, the corresponding data is stored in a cache with which a cache distance corresponding to a distance between caches is shorter.

* * * * *